US011548171B2

(12) United States Patent
Lee et al.

(10) Patent No.: US 11,548,171 B2
(45) Date of Patent: Jan. 10, 2023

(54) ROBOT ARM, MECHANICAL ASSEMBLY AND ASSEMBLY METHOD THEREOF

(71) Applicant: INDUSTRIAL TECHNOLOGY RESEARCH INSTITUTE, Hsinchu (TW)

(72) Inventors: Shih-Ping Lee, Hsinchu (TW); Hen-Diong Kng, Zhudong Township (TW); Hao-Yan Wu, Tainan (TW); Tsang-Fang Jeng, Hsinchu (TW); Shu Huang, Zhudong Township (TW); Hung-Hsiu Yu, Zhubei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 221 days.

(21) Appl. No.: 16/989,525

(22) Filed: Aug. 10, 2020

(65) Prior Publication Data

US 2021/0129356 A1  May 6, 2021

Related U.S. Application Data

(60) Provisional application No. 62/928,339, filed on Oct. 30, 2019.

(30) Foreign Application Priority Data

Jun. 4, 2020 (TW) ................................ 109118852

(51) Int. Cl.
*B25J 17/00* (2006.01)
*B25J 9/00* (2006.01)
*B25J 15/04* (2006.01)

(52) U.S. Cl.
CPC ............. *B25J 17/00* (2013.01); *B25J 9/0009* (2013.01); *B25J 15/045* (2013.01)

(58) Field of Classification Search
CPC ...... B25J 15/0458; B25J 17/00; B25J 9/0009; B25J 15/045; F16L 23/04; F16B 2001/0092; F16B 1/00
(Continued)

(56) References Cited

U.S. PATENT DOCUMENTS

| 1,043,412 | A | * | 11/1912 | Faunce | ................... | F16L 23/04 |
| | | | | | | 220/687 |
| 3,877,730 | A | * | 4/1975 | Frantz | ..................... | F16L 55/18 |
| | | | | | | 285/55 |
| 4,506,559 | A | * | 3/1985 | Francke | .................. | F16H 55/46 |
| | | | | | | 74/439 |

(Continued)

FOREIGN PATENT DOCUMENTS

| CN | 100408968 C | 8/2008 |
| CN | 205043767 U | 2/2016 |

(Continued)

OTHER PUBLICATIONS

Taiwanese Office Action and Search Report for Taiwanese Application No. 109118852, dated Sep. 15, 2021.

(Continued)

*Primary Examiner* — Jake Cook
*Assistant Examiner* — T. Scott Fix
(74) *Attorney, Agent, or Firm* — Birch, Stewart, Kolasch & Birch, LLP

(57) ABSTRACT

A robot arm including a first joint, a second joint, and a coupling element is provided. The first joint has a first inclined surface. The second joint is jointed to the first joint and has a second inclined surface. The coupling element has a third inclined surface and a fourth inclined surface opposite to the third inclined surface, wherein the third inclined surface contacts the first inclined surface, and the fourth inclined surface contacts the second inclined surface.

16 Claims, 12 Drawing Sheets

(58) Field of Classification Search
USPC ......... 403/383, 375, 374.1, 374.3, 373, 341, 403/338, 335, 334, 333, 205, 348
See application file for complete search history.

(56) References Cited

U.S. PATENT DOCUMENTS

| | | | | |
|---|---|---|---|---|
| 5,383,738 | A * | 1/1995 | Herbermann | F21V 21/29 403/56 |
| 6,439,619 | B1 * | 8/2002 | Storage | F16L 23/04 285/365 |
| 6,494,407 | B2 * | 12/2002 | Arulf | B64G 1/641 403/333 |
| 6,952,882 | B2 | 10/2005 | Raab et al. | |
| 8,992,113 | B2 | 3/2015 | Campagna et al. | |
| 9,505,136 | B1 | 11/2016 | Nusser et al. | |
| 10,072,467 | B2 | 9/2018 | Salem et al. | |
| 10,272,575 | B2 | 4/2019 | Pedersen et al. | |
| 2001/0009634 | A1 * | 7/2001 | Giesenberg | F42B 15/36 403/338 |
| 2003/0198512 | A1 * | 10/2003 | Arulf | B64G 1/641 403/338 |
| 2016/0361825 | A1 * | 12/2016 | Zanella | F16B 7/0426 |
| 2017/0100844 | A1 | 4/2017 | Raak et al. | |
| 2019/0314645 | A1 | 10/2019 | Ciresianu et al. | |
| 2020/0108497 | A1 * | 4/2020 | Miyazaki | B25J 15/045 |

FOREIGN PATENT DOCUMENTS

| | | | |
|---|---|---|---|
| CN | 105983977 | A | 10/2016 |
| CN | 205928704 | U | 2/2017 |
| CN | 107199557 | A | 9/2017 |
| CN | 107398886 | A | 11/2017 |
| CN | 209111106 | U | 7/2019 |
| EP | 3348361 | A1 * | 7/2018 ......... B25J 15/0408 |
| GB | 2227065 | A * | 7/1990 ............. F16L 17/04 |
| TW | M587102 | U | 12/2019 |
| WO | WO 2017/198206 | A1 | 11/2017 |
| WO | WO 2018/040541 | A1 | 3/2018 |

OTHER PUBLICATIONS

Abdel-Malek et al., "Criteria for the Design of Manipulator Arms for a High Stiffness to Weight Ratio", SME Journal of Manufacturing Systems, 1998, vol. 17, No. 3, pp. 209-220, Total 21 pages.

Benhabib et al., "Mechanical Design of a Modular Robot for Industrial Applications", Journal of Manufacturing Systems, 1991, vol. 10, No. 4, pp. 297-306.

Chen et al., "Configuration Independent Kinematics for Modular Robots", Proceedings of the 1996 IEEE International Conference on Robotics and Automation, Apr. 1996, IEEE, pp. 1440-1445.

Cohen et al., "Conceptual Design of a Modular Robot", Journal of Mechanical Design, Mar. 1992, vol. 114, pp. 117-125.

Kamimura et al., "Self-Reconfigurable Modular Robot—Experiments on Reconfiguration and Locomotion", Proceedings of the 2001 IEEE/RSJ International Conference on Intelligent Robots and Systems, IEEE, 2001, pp. 606-612.

Schmitz et al., "The CMU Reconfigurable Modular Manipulator System", Carnegie Mellon University, Research Showcase® CMU, 1988, Total 25 pages.

* cited by examiner

ROBOT ARM, MECHANICAL ASSEMBLY AND ASSEMBLY METHOD THEREOF

This application claims the benefit of U.S. provisional application Ser. No. 62/928,339, filed Oct. 30, 2019, the subject matter of which is incorporated herein by reference, and claims the benefit of Taiwan application Serial No. 109118852, filed Jun. 4, 2020, the subject matter of which is incorporated herein by reference.

TECHNICAL FIELD

The disclosure relates in general to a robot arm, the mechanical assembly and an assembly method thereof, and more particularly to a robot arm assembled according to the principles of inclined surfaces, a mechanical assembly and an assembly method thereof.

BACKGROUND

A robot arm normally is provided with several joints. The joints are respectively manufactured and then are screwed together using threaded elements. Normally, two joints are jointed together by two opposite surfaces of the joints. However, the space between the two jointing surfaces is very narrow, and extra locking tools are required to screw the two joints using threaded elements. Even with the use of tools, it is still very inconvenient and time consuming to operate the threaded elements in such a narrow space.

Therefore, it has become a prominent task for the industries to provide a robot arm to facilitate the assembly process.

SUMMARY

The disclosure is directed to a robot arm, a mechanical assembly and an assembly method thereof capable of resolving the above generally known problems.

According to one embodiment, a robot arm is provided. The robot arm includes a first joint, a second joint, and a coupling element. The first joint has a first inclined surface. The second joint is jointed to the first joint and has a second inclined surface. The coupling element has a third inclined surface and a fourth inclined surface opposite to the third inclined surface, wherein the third inclined surface contacts the first inclined surface, and the fourth inclined surface contacts the second inclined surface.

According to another embodiment, a mechanical assembly is provided. The mechanical assembly includes a first component, a second component, and a coupling element. The first component has a first inclined surface. The second component is jointed to the first component and has a second inclined surface. The coupling element has a third inclined surface and a fourth inclined surface opposite to the third inclined surface, wherein the third inclined surface contacts the first inclined surface, and the fourth inclined surface contacts the second inclined surface.

According to an alternative embodiment, an assembly method of a robot arm is provided. The assembly method includes the following steps: providing a first joint, a second joint, and a coupling element, wherein the first joint has a first inclined surface, the second joint has a second inclined surface, and the coupling element has a third inclined surface and a fourth inclined surface opposite to the third inclined surface; jointing the first joint to the second joint; and, coupling the first joint and the second joint using the coupling element, wherein the third inclined surface contacts the first inclined surface, and the fourth inclined surface contacts the second inclined surface.

The above and other aspects of the invention will become better understood with regard to the following detailed description of the preferred but non-limiting embodiment (s). The following description is made with reference to the accompanying drawings.

Figure 1A:
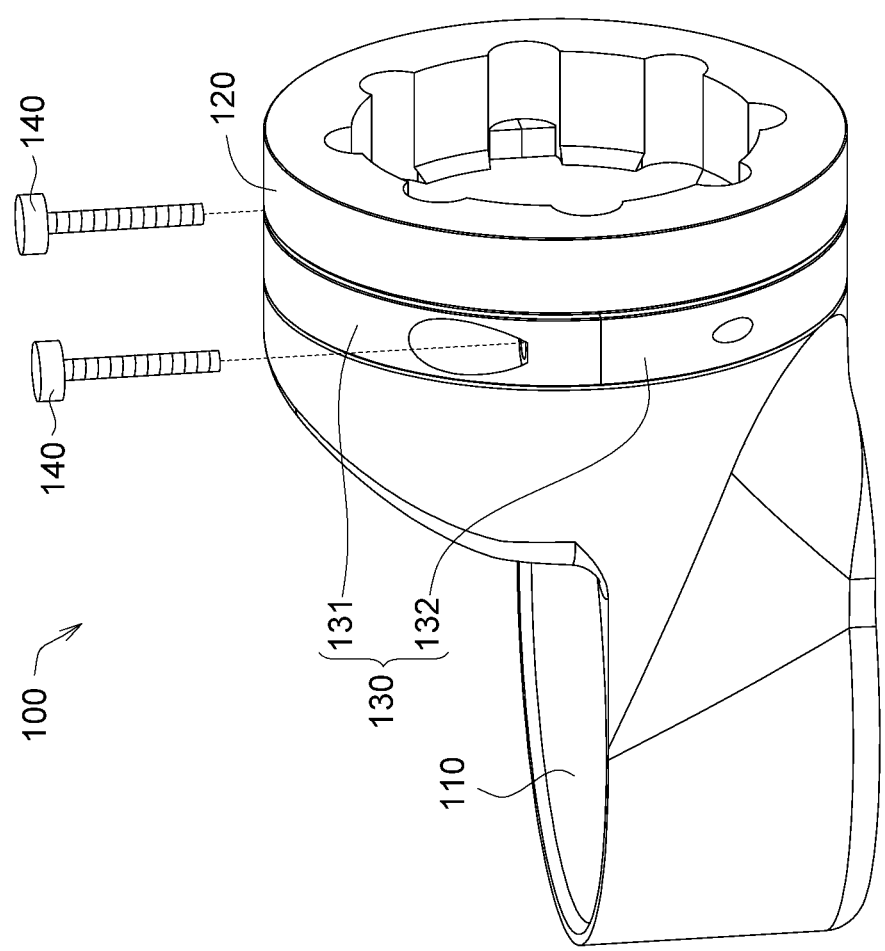
FIGS. 1A to 1C are schematic diagrams of a robot arm according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

The present disclosure discloses a mechanical assembly, including a first component, a second component, and a coupling element. The first component has a first inclined surface, the second component has a second inclined surface, and the coupling element has a third inclined surface and a fourth inclined surface opposite to the third inclined surface. The third inclined surface contacts the first inclined surface, and the fourth inclined surface contacts the second inclined surface. Thus, the first component, the second component, and the coupling element can be engaged with each other through the said inclined surfaces. The mechanical assembly can be a robot arm or two components that need to be coupled together. The mechanical assembly of the present disclosure is exemplified by a robot arm 100 below.

Figure 1B:
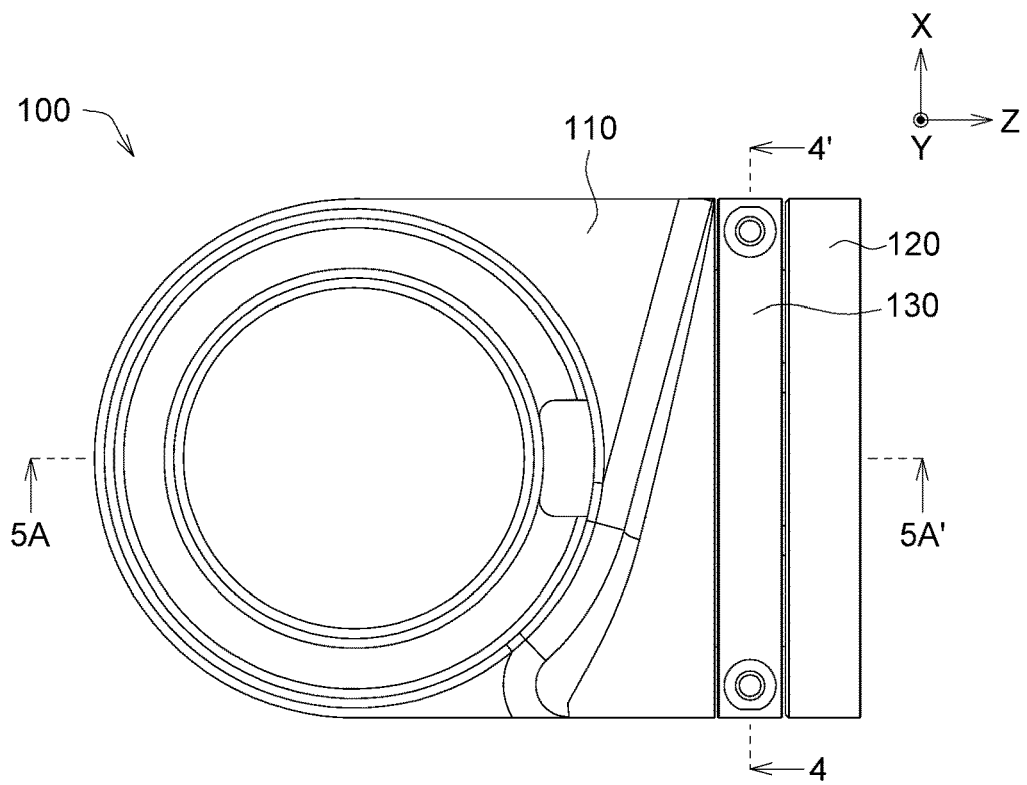
Figure 1C:
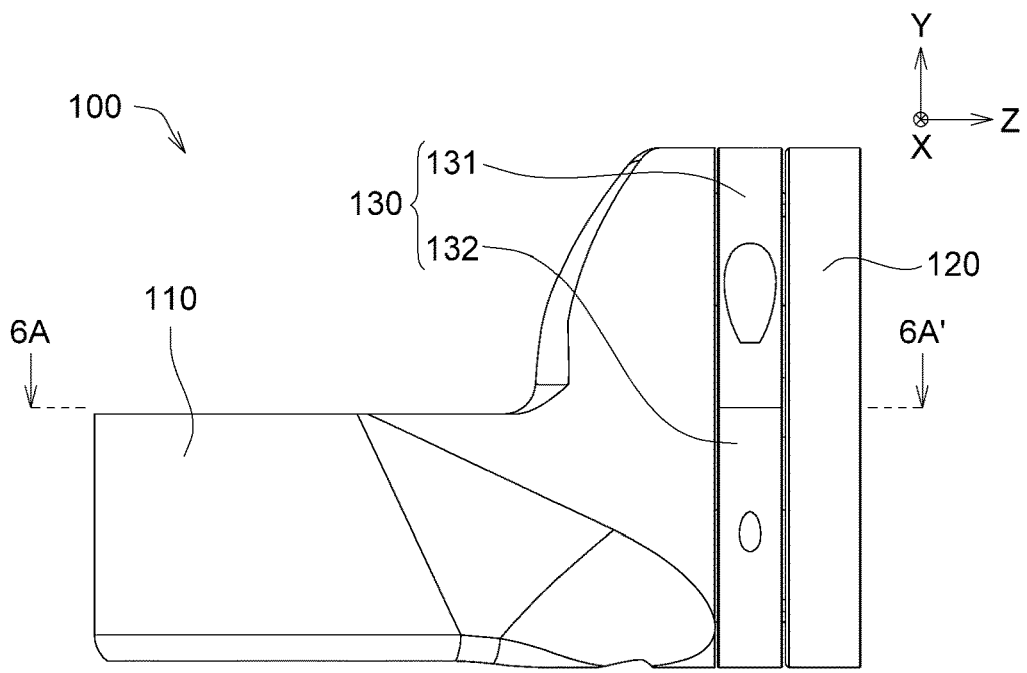
Figure 2:
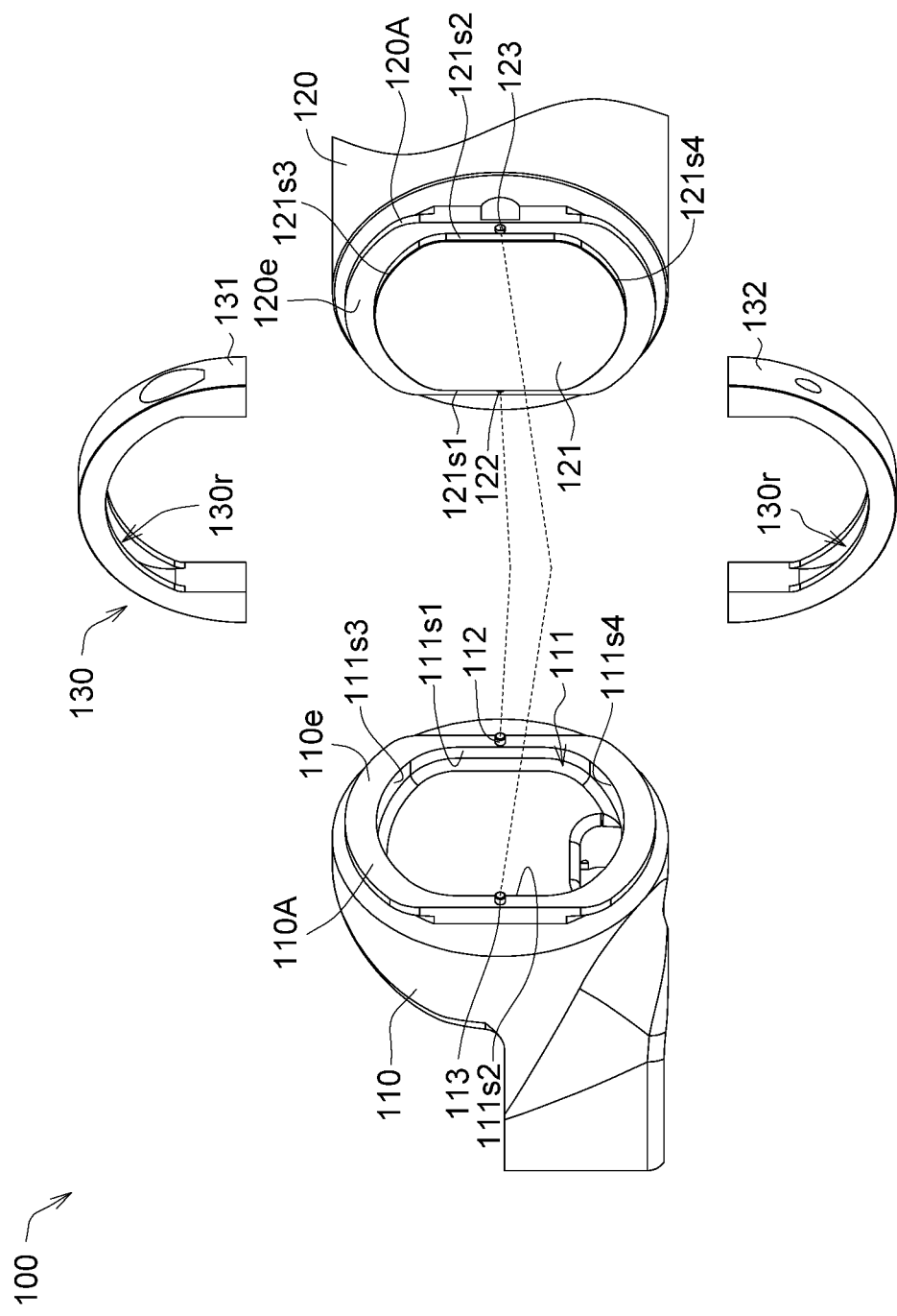
FIGS. 2 and 3 are explosion diagrams of the robot arm of FIG. 1A.
Figure 3:
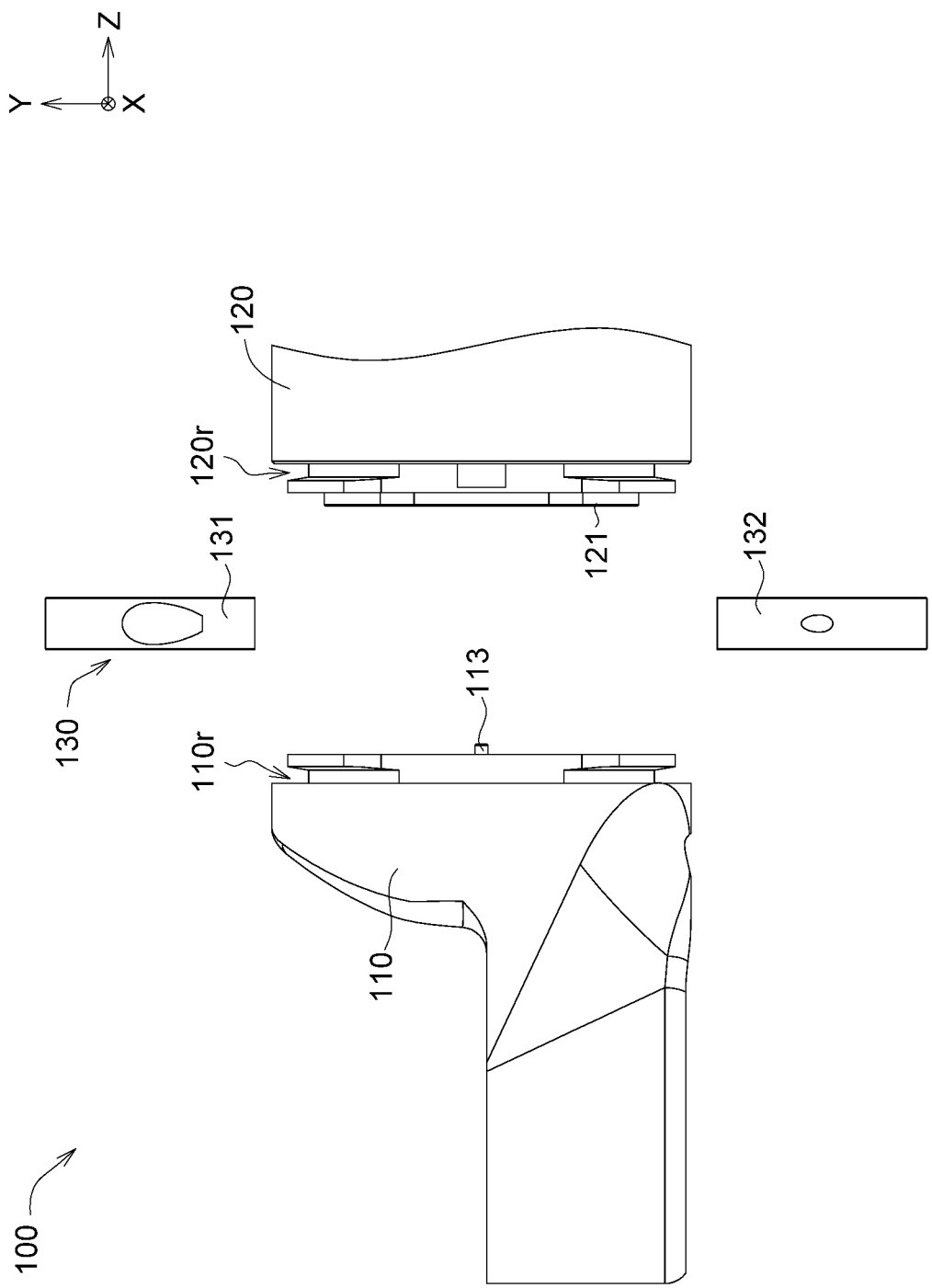
Figure 4:
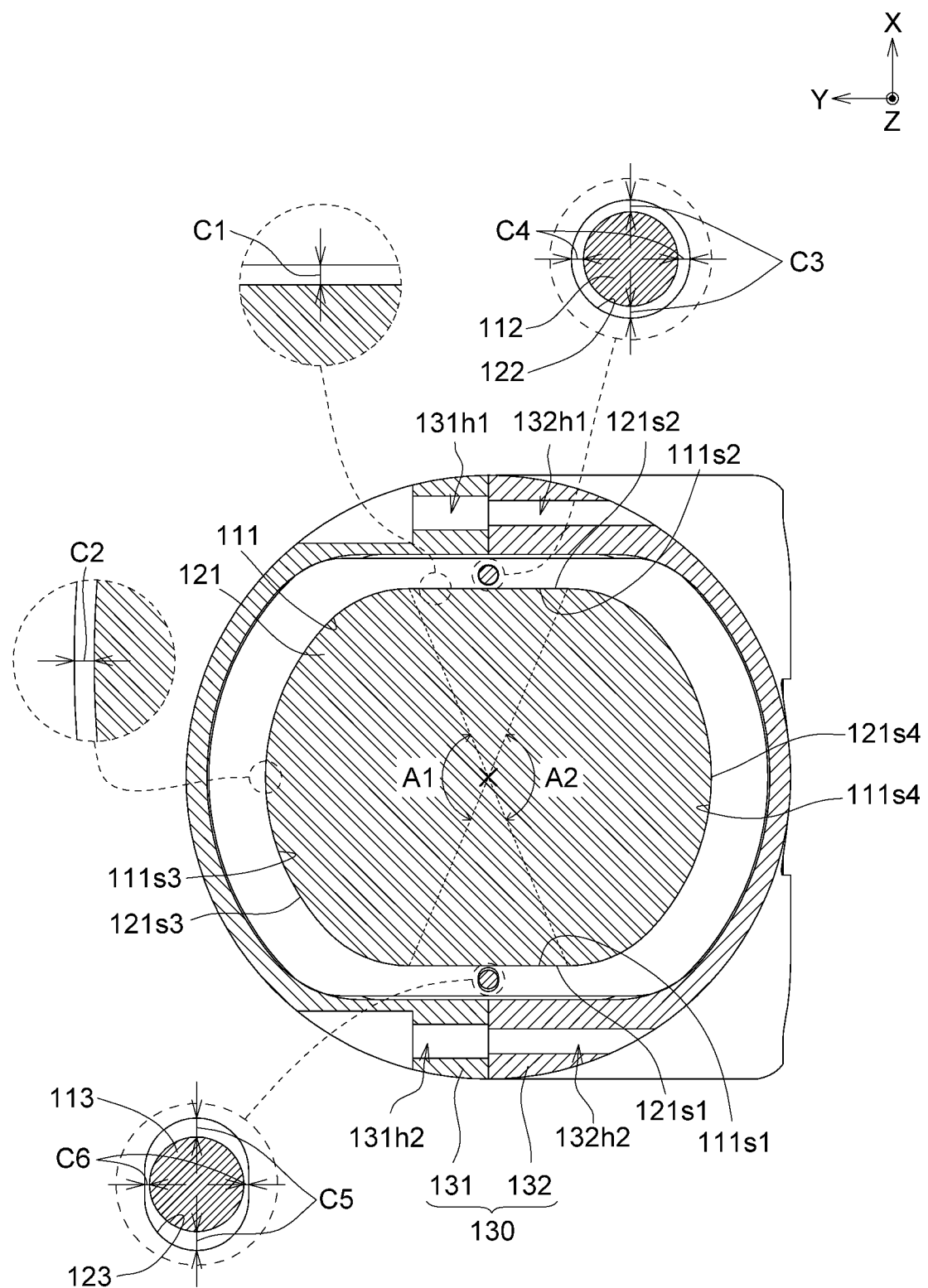
FIG. 4 is a cross-sectional view of the robot arm of FIG. 1B along direction 4-4'.
Figure 5A:
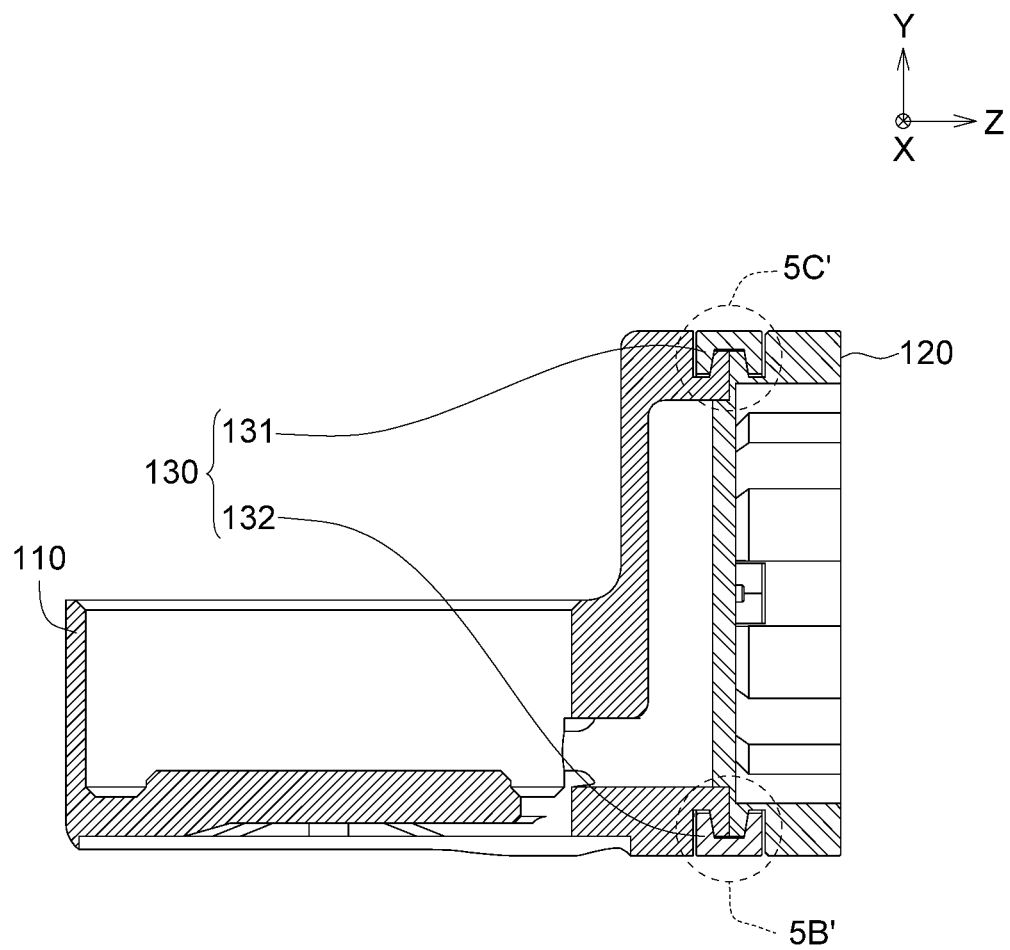
FIG. 5A is a cross-sectional view of the robot arm of FIG. 1B along direction 5A-5A'.
Figure 5B:
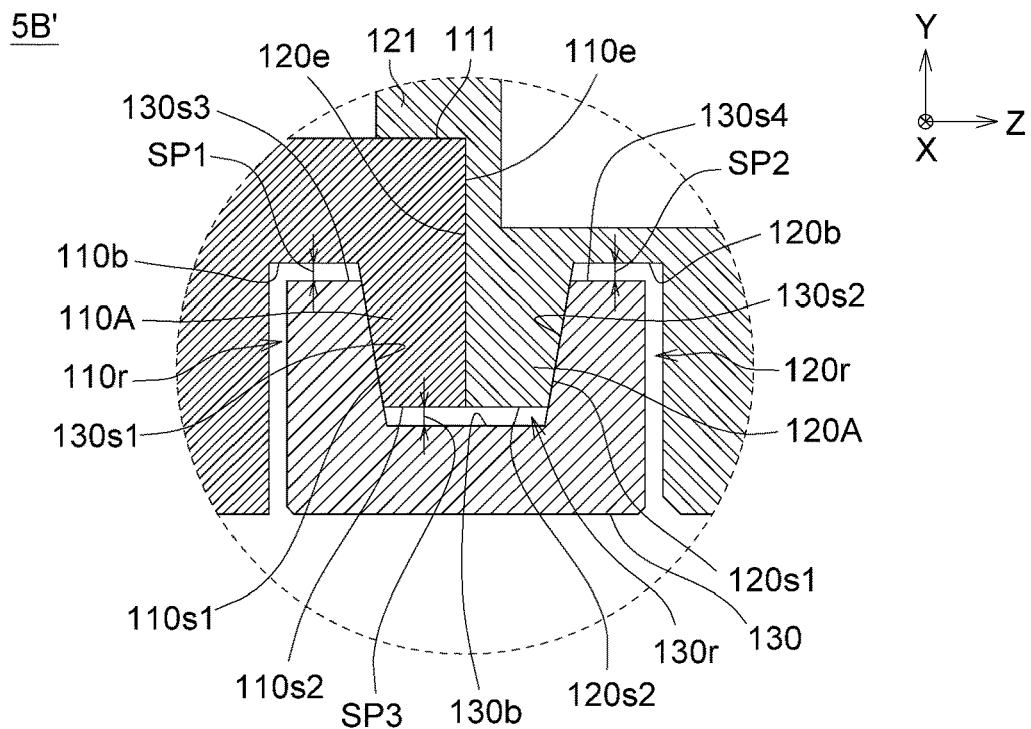
FIG. 5B is an enlargement diagram of the portion 5B' of FIG. 5A.
Figure 5C:
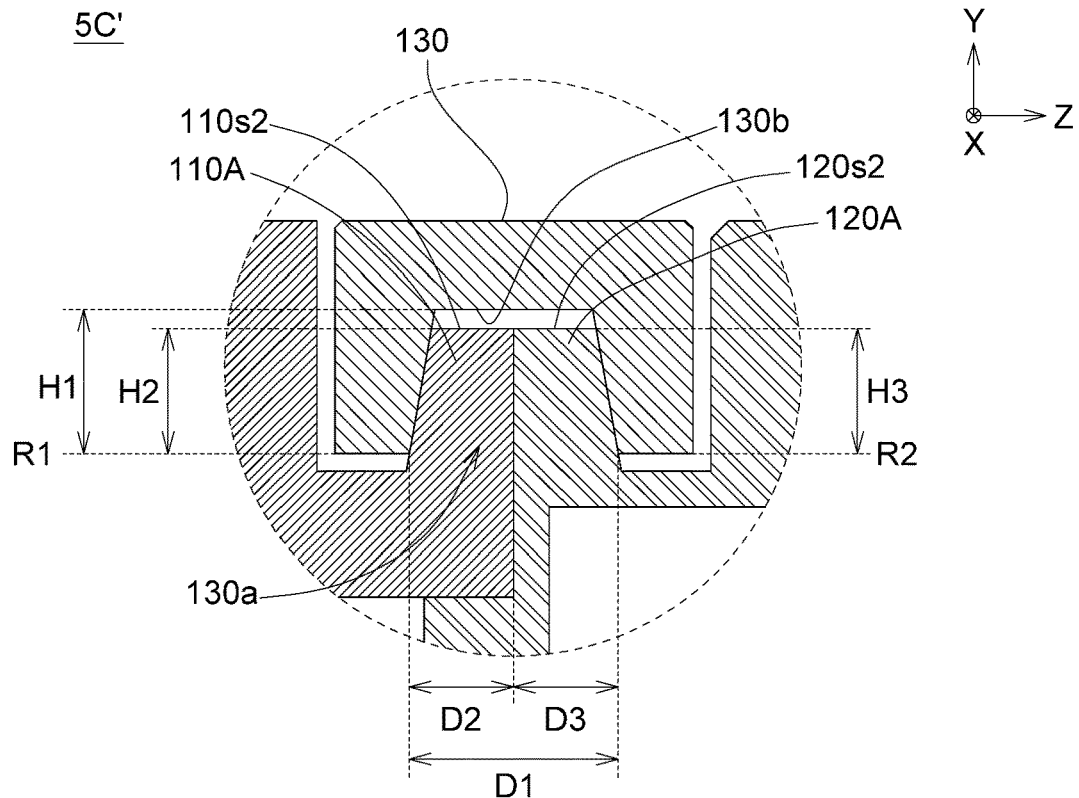
FIG. 5C is an enlargement diagram of the portion 5C' of FIG. 5A.

Refer to FIGS. 1A to 5C. FIGS. 1A to 1C are schematic diagrams of a robot arm 100 according to an embodiment of the present disclosure. FIGS. 2 and 3 are explosion diagrams of the robot arm 100 of FIG. 1A. FIG. 4 is a cross-sectional view of the robot arm 100 of FIG. 1B along direction 4-4'. FIG. 5A is a cross-sectional view of the robot arm 100 of FIG. 1B along direction 5A-5A'. FIG. 5B is an enlargement diagram of the portion 5B' of FIG. 5A. FIG. 5C is an enlargement diagram of the portion 5C' of FIG. 5A. FIGS. 6A to 6E are diagrams showing an assembly process of the robot arm 100 of FIG. 1A.

As indicated in FIGS. 1A to 1C, the robot arm 100 includes a first joint 110, a second joint 120, a coupling element 130, and at least one fixing element 140 (the fixing element 140 is not illustrated in FIGS. 1B and 1C). As indicated in FIGS. 5A to 5C, the first joint 110 has a first inclined surface 110s1. The second joint 120 has a second inclined surface 120s1. The coupling element 130 has a third inclined surface 130s1 and a fourth inclined surface 130s2 opposite to the third inclined surface 130s1. The third inclined surface 130s1 contacts the first inclined surface 110s1, and the fourth inclined surface 130s2 contacts the second inclined surface 120s1. Thus, the first joint 110, the second joint 120, and the coupling element 130 can be engaged with each other through the first inclined surface 110s1, the second inclined surface 120s1, the third inclined surface 130s1, and the fourth inclined surface 130s2.

In an embodiment, the third inclined surface 130s1 of the coupling element 130 contacts the first inclined surface 110s1 along the Z axis, and the fourth inclined surface 130s2 of the coupling element 130 contacts the second inclined surface 120s1 along the Z axis. Thus, the coupling element 130 can limit the amount of relative displacement between the first joint 110 and the second joint 120 along the Z axis. The Z axis is such as the jointing direction of the first joint 110 and the second joint 120, and in the accompanying drawings, the XY plane is substantially perpendicular to the Z axis.

As indicated in FIGS. 5A to 5C, the first joint 110 has a first recess 110r recessed from the first outer peripheral surface 110s2 of the first joint 110. The second joint 120 has a second recess 120r recessed from the second outer peripheral surface 120s2 of the second joint 120. The first recess 110r has a first inclined surface 110s1, and the second recess 120r has a second inclined surface 120s1. The coupling element 130 has a first inner peripheral surface 130s3 and a second inner peripheral surface 130s4. As indicated in FIG. 5B, the first inner peripheral surface 130s3 is separated from the recess bottom 110b of the first recess 110r by a space SP1. The space SP1 provides an accommodation space for the coupling element 130 to move towards the recess bottom 110b, such that the third inclined surface 130s1 of the coupling element 130 can tightly contact the first inclined surface 110s1 (without the space SP1, the first inner peripheral surface 130s3 will contact the recess bottom 110b of the first recess 110r, hence preventing the third inclined surface 130s1 of the coupling element 130 from tightly contacting the first inclined surface 110s1).

Similarly, as indicated in FIG. 5B, the second inner peripheral surface 130s4 is separated from the recess bottom 120b of the second recess 120r by a space SP2. The space SP2 provides an accommodation space for the coupling element 130 to move towards the recess bottom 120b, such that the fourth inclined surface 130s2 of the coupling element 130 can tightly contact the second inclined surface 120s1 (without the space SP2, the second inner peripheral surface 130s4 will contact the recess bottom 120b of the second recess 120r, hence preventing the fourth inclined surface 130s2 of the coupling element 130 from tightly contacting the second inclined surface 120s1).

As indicated in FIGS. 5A and 5B, the first joint 110 includes a positioning hole 111, and the second joint 120 includes a positioning shaft 121. The first joint 110 has a first terminal surface 110e, and the positioning hole 111 is recessed relative to the first terminal surface 110e. The second joint 120 has a second terminal surface 120e, and the positioning shaft 121 is protruded relative to the second terminal surface 120e. When the first joint 110 is jointed to the second joint 120, the first terminal surface 110e contacts (such as presses) the second terminal surface 120e.

The positioning hole 111 and the positioning shaft 121 can be engaged with each other to limit the amount of relative movement between the first joint 110 and the second joint 120 along the XY plane. For example, as indicated in FIG. 4, the positioning hole 111 has a first planar surface 111s1, a second planar surface 111s2 opposite to the first planar surface 111s1, a first curved surface 111s3, and a second curved surface 111s4 opposite to the first curved surface 111s3. The first curved surface 111s3 and the second curved surface 111s4 connect the first planar surface 111s1 and the second planar surface 111s2. The positioning shaft 121 has a third planar surface 121s1, a fourth planar surface 121s2 opposite to the third planar surface 121s1, a third curved surface 121s3, and a fourth curved surface 121s4 opposite to the third curved surface 121s3. The third curved surface 121s3 and the fourth curved surface 121s4 connect the third planar surface 121s1 and the fourth planar surface 121s2. After the first joint 110 and the second joint 120 are assembled, as indicated in FIG. 4, the positioning hole 111 and the positioning shaft 121 match each other, wherein the first planar surface 111s1 is opposite to the third planar surface 121s1, the second planar surface 111s2 is opposite to the fourth planar surface 121s2, the first curved surface 111s3 is opposite to the third curved surface 121s3, and the second curved surface 111s4 is opposite to the fourth curved surface 121s4. Through relative arrangements of the surfaces, the amount of relative movement between the first joint 110 and the second joint 120 along the XY plane can therefore be limited.

As the first planar surface 111s1 is opposite to the third planar surface 121s1 and the second planar surface 111s2 is opposite to the fourth planar surface 121s2, the amount of relative displacement between the first joint 110 and the second joint 120 along the X axis is limited. As the first curved surface 111s3 is opposite to the third curved surface 121s3 and the second curved surface 111s4 is opposite to the fourth curved surface 121s4, the amount of relative displacement between the first joint 110 and the second joint 120 along the Y axis is limited. The X axis and the Y axis substantially are perpendicular to each other.

In the present embodiment as indicated in FIG. 4, the said curved surfaces are such as cylindrical faces. In an embodiment, the central angle A1 between the first curved surface 111s3 and the third curved surface 121s3 can be any value in a range of 60° to 150°, preferably but not restrictively, greater than 120°, and the central angle A2 between the second curved surface 111s4 and the fourth curved surface 121s4 can be any value in a range of 60° to 150°, preferably but not restrictively, in a range of 70° to 130° or greater than 100°. Besides, the center of circle of the first curved surface 111s3 and the center of circle of the second curved surface 111s4 overlap (for example, can be concurrent). However, the center of circle of the first curved surface 111s3 and the center of circle of the second curved surface 111s4 do not have to overlap. Similarly, the center of circle of the third curved surface 121s3 and the center of circle of the fourth curved surface 121s4 overlap (for example, can be concurrent). However, the center of circle of the third curved surface 121s3 and the center of circle of the fourth curved surface 121s4 do not have to overlap.

In an embodiment as indicated in FIG. 4, a first clearance C1 is formed between the positioning hole 111 and the positioning shaft 121 along the first clearance direction (such as the X axis), and a second clearance C2 is formed between the positioning hole 111 and the positioning shaft 121 along the second clearance direction (such as the Y axis). The first clearance C11 is in a range of +0.3 to 0.6 mm (for example, single-sided clearance), the amount of clearance enables the positioning hole 111 and the positioning shaft 121 to be easily engaged with each other. Furthermore, the double-sided clearance of the first clearance C1 is twice the single-sided clearance; or the value range of the first clearance C1 also can be the double-sided clearance.

Also, the first clearance C1 and the second clearance C2 are different. In the present embodiment, the second clearance C2 is less than the first clearance C1, and after the positioning hole 111 and the positioning shaft 121 are engaged with each other, the amount of relative displacement between the positioning hole 111 and the positioning shaft 121 along the second clearance direction is less than the amount of relative displacement between the positioning hole 111 and the positioning shaft 121 along the first clearance direction. In an embodiment, the second clearance C2 is in a range of +0.01 to 0.03 mm, the amount of clearance allows the positioning hole 111 and the positioning shaft 121 to be precisely engaged along the second clearance direction or free of relative displacement along the second clearance direction, or the amount of relative displacement between the positioning hole 111 and the positioning shaft 121 does not affect the function of the robot arm 100. The value range of the second clearance C2 is a single-sided clearance, and the double-sided clearance is twice the single-sided clearance.

Although the first clearance C1 is greater than the second clearance C2 (the positioning hole 111 and the positioning shaft 121 will move relatively along the first clearance direction due to the clearance), the amount of relative displacement between the first joint 110 and the second joint 120 along the first clearance direction can be reduced as the first positioning portion 112 and the second positioning portion 122 are engaged with each other. Detailed descriptions are exemplified below.

As indicated in FIG. 2 and FIGS. 5A to 5C, the first joint 110 includes a first positioning portion 112, and the second joint 120 includes a second positioning portion 122. In an embodiment, one of the first positioning portion 112 and the second positioning portion 122 is such as a positioning hole, and the other one of the first positioning portion 112 and the second positioning portion 122 is such as a positioning column. In the present disclosure, the first positioning portion 112 is exemplified by the positioning column, and the second positioning portion 122 is exemplified by the positioning hole. As indicated in FIG. 2, wherein the first positioning portion 112 is protruded relative to the first terminal surface 110e, and the second positioning portion 122 is recessed relative to the second terminal surface 120e. In terms of the shape, the cross-sectional shape of the first positioning portion 112 (such as the XY plane) is such as circular, and the cross-sectional shape of the second positioning portion 122 (such as the XY plane) is similar to the cross-sectional shape of the first positioning portion 112.

Refer to FIG. 4. The engagement between the first positioning portion 112 and the second positioning portion 122 can limit the amount of relative movement between the first joint 110 and the second joint 120 along the first clearance direction (such as the X axis). A third clearance C3 is formed between the first positioning portion 112 and the second positioning portion 122 along the first clearance direction (such as the X axis). A fourth clearance C4 is formed between the first positioning portion 112 and the second positioning portion 122 along the second clearance direction (such as the Y axis). In an embodiment, since the cross-sectional shape of the first positioning portion 112 and the cross-sectional shape of the second positioning portion 122 are circular, the third clearance C3 and the fourth clearance C4 are the same. In terms of the size, the third clearance C3 is in a range of 0.004 to 0.018 mm (for example, double-sided clearance), and the fourth clearance C4 is in a range of 0.004 to 0.018 mm (for example, double-sided clearance). The amount of clearance makes the first positioning portion 112 and the second positioning portion 122 be tightly engaged with each other. Additionally, the third clearance C3 is less than the first clearance C1. Thus, through the design of a smaller third clearance C3, the amount of relative displacement between the first joint 110 and the second joint 120 along the first clearance direction can be reduced.

As disclosed above, the engagement between the positioning hole 111 and the positioning shaft 121 and the engagement between the first positioning portion 112 and the second positioning portion 122 can limit the amount of relative movement between the first joint 110 and the second joint 120 along the XY plane, but the first joint 110 and the second joint 120 still have degrees of freedom of rotating around the Z axis (for example, the first joint 110 and the second joint 120 still can rotate around the first positioning portion 112 and the second positioning portion 122). However, the engagement between the third positioning portion 113 and the fourth positioning portion 123 can limit the degree of freedom with which the first joint 110 and the second joint 120 rotate around the Z axis. Detailed descriptions are exemplified below.

As indicated in FIGS. 2 and 4, the first joint 110 includes a third positioning portion 113, and the second joint 120 includes a fourth positioning portion 123. One of the third positioning portion 113 and the fourth positioning portion 123 is such as a long recess hole, and the other one of the third positioning portion 113 and the fourth positioning portion 123 is such as a positioning column. In the present disclosure, the third positioning portion 113 is exemplified by a positioning column, and the fourth positioning portion 123 is exemplified by a long recess hole, wherein the third positioning portion 113 is protruded relative to the first terminal surface 110e, and the fourth positioning portion 123 is recessed relative to the second terminal surface 120e.

As indicated in FIG. 4, the third positioning portion 113 and the fourth positioning portion 123 are engaged with each other. A fifth clearance C5 is formed between the third positioning portion 113 and the fourth positioning portion 123 along the first clearance direction (such as the X axis). A sixth clearance C6 is formed between the third positioning portion 113 and the fourth positioning portion 123 along the second clearance direction (such as the Y axis). In an embodiment, the fourth positioning portion 123 is a long recess hole extended along the first clearance direction (such as the X axis), therefore the fifth clearance C5 is greater than the sixth clearance C6. The fifth clearance C5 can provide a sufficient allowance to the third positioning portion 113 and the fourth positioning portion 123 along the first clearance direction, such that the third positioning portion 113 and the fourth positioning portion 123 can be more quickly engaged with each other. In terms of the size, the fifth clearance C5 is in a range of 1 to 1.6 mm (for example, double-sided clearance), and the amount of clearance provides a sufficient allowance enabling the third positioning portion 113 and the fourth positioning portion 123 to be more quickly engaged with each other. The value range of the sixth clearance C6 is such as in a range of 0.004 to 0.018 millimeter (mm), can be the same as the third clearance C3 or the fourth clearance C4. The amount of clearance can limit the amount of relative rotation between the first positioning portion 112 and the second positioning portion 122 along the second clearance direction. Thus, when the first joint 110 and the second joint 120 rotate around the Z axis using the first positioning portion 112 and the second positioning portion 122 as the pivots. The first joint 110 and the second joint 120 are limited by the third positioning portion 113 and the fourth positioning portion 123 (such as along the Y axis), and therefore cannot rotate around the Z axis.

As disclosed above, although the second clearance C2 is greater than the first clearance C1, after the first positioning portion 112 and the second positioning portion 122 are engaged with each other, the third clearance C3 and the fourth clearance C4 are less than the first clearance C1 and the second clearance C2, and the amount of relative displacement between the first joint 110 and the second joint 120 along the XY plane can be reduced. Moreover, after the third positioning portion 113 and the fourth positioning portion 123 are engaged with each other, the amount of relative rotation through which the first joint 110 and the second joint 120 rotate around the Z axis can be limited.

As indicated in FIG. 5B, the coupling element 130 has a groove 130r with a groove bottom 130b. The groove 130r is recessed relative to the first inner peripheral surface 130s3 and the second inner peripheral surface 130s4. The first joint 110 further has a first outer peripheral surface 110s2, and the second joint 120 further has a second outer peripheral surface 120s2. The first outer peripheral surface 110s2 and the second outer peripheral surface 120s2 are separated from the groove bottom 130b by a space SP3. The space SP3 provides an accommodation space for the first joint 110 and the second joint 120 to move towards the groove bottom 130b, such that the third inclined surface 130s1 of the coupling element 130 can tightly contact the first inclined surface 110s1, and the fourth inclined surface 130s2 of the coupling element 130 can tightly contact the second inclined surface 120s1. Conversely, if the space SP3 is omitted, the groove bottom 130b of the coupling element 130 will contact the outer peripheral surface (the first outer peripheral surface 110s2 and the second outer peripheral surface 120s2), hence preventing the third inclined surface 130s1 of the coupling element 130 from tightly contacting the first inclined surface 110s1 and preventing the fourth inclined surface 130s2 of the coupling element 130 from tightly contacting the second inclined surface 120s1).

As indicated in FIG. 5B and 5C, the first joint 110 includes a first flange 110A with a first outer peripheral surface 110s2. The second joint 120 includes a second flange 120A with a second outer peripheral surface 120s2. When the coupling element 130 is coupled with the first joint 110 and the second joint 120, the first flange 110A and the second flange 120A are located within the groove 130r.

As indicated in FIG. 5B, during the process of coupling the coupling element 130 with the first joint 110 and the second joint 120, a space is maintained between the groove bottom 130b of the coupling element 130 and the outer peripheral surface (including the first outer peripheral surface 110s2 and the second outer peripheral surface 120s2), such that the third inclined surface 130s1 of the coupling element 130 can tightly contact the first inclined surface 110s1, and the fourth inclined surface 130s2 of the coupling element 130 can tightly contact the second inclined surface 120s1. As indicated in FIG. 5C, the groove 130r has an opening 130a with a width D1. The groove 130r has a groove height H1, which is the distance between the opening 130a and the groove bottom 130b. The first flange 110A has a first height H2, which is the distance between the first outer peripheral surface 110s2 and a reference R1. The first flange 110A has a first thickness D2 at the reference R1. The second flange 120A has a second height H3, which is the distance between the second outer peripheral surface 120s2 and a reference R2. The second flange 120A has a second thickness D3 at the reference R2. When the first flange 110A and the second flange 120A are tightly engaged with the groove 130r, the reference R1 of the first flange 110A, the reference R2 of the second flange 120A, and the opening 130a substantially overlap along the Z axis, and the groove height H1 is greater than the first height H2 of the first flange 110A and the second height H3 of the second flange 120A. Thus, a space can be maintained between the groove bottom 130b of the coupling element 130 and outer peripheral surface (including the first outer peripheral surface 110s2 and the second outer peripheral surface 120s2), such that the third inclined surface 130s1 of the coupling element 130 can tightly contact the first inclined surface 110s1, and the fourth inclined surface 130s2 of the coupling element 130 can tightly contact the second inclined surface 120s1.

Besides, the coupling element 130 can limit the relative rotation through which the first joint 110 and the second joint 120 rotate around the X axis and the Y axis. As indicated in FIGS. 3 and 4, the first flange 110A and the second flange 120A are extended around the Z axis for 360°, and the coupling element 130 is also extended around the Z axis for 360°. Thus, after the coupling element 130, the first joint 110 and the second joint 120 are assembled as indicated in FIGS. 5A to 5C, the coupling element 130 can be circumferentially engaged with the first recess 110r and the second recess 120r, and the coupling element 130 can limit the relative rotation through which the first joint 110 and the second joint 120 rotate around the X axis and the Y axis.

As indicated in FIGS. 1 to 4, 5A and 5B, the coupling element 130 includes a first sub-coupling element 131 and a second sub-coupling element 132 jointed to the first sub-coupling element 131. The first sub-coupling element 131 has a portion of the groove 130r, and the second sub-coupling element 132 has another portion (such as the remaining portion) of the groove 130r. In an embodiment, the first sub-coupling element 131 has a portion of the third inclined surface 130s1, and the second sub-coupling element 132 has another portion (such as the remaining portion) of the third inclined surface 130s1; the first sub-coupling element 131 has a portion of the fourth inclined surface 130s2, and the second sub-coupling element 132 has another portion (such as the remaining portion) of the fourth inclined surface 130s2.

The fixing element 140 (illustrated in FIG. 1A) fixes the first sub-coupling element 131 and the second sub-coupling element 132. Refer to FIG. 4. The first sub-coupling element 131 has a first through hole 131h1, and the second sub-coupling element 132 has a first concave hole 132h1. In an embodiment, the fixing element 140, such as screw bolt, has male threads, and the first concave hole 132h1 has female threads. One fixing element 140 passes through the first through hole 131h1 and is screwed with the female threads of the first concave hole 132h1 to temporarily fix the first sub-coupling element 131 and the second sub-coupling element 132, and accordingly fix the first joint 110 and the second joint 120. Similarly, the first sub-coupling element 131 has a second through hole 131h2, and the second sub-coupling element 132 has a second concave hole 132h2. In an embodiment, the second concave hole 132h2 has female threads. Another fixing element 140 passes through the second through hole 131h2 and is screwed with the female threads of the second concave hole 132h2 to temporarily fix the first sub-coupling element 131 and the second sub-coupling element 132, and accordingly fix the first joint 110 and the second joint 120.

As indicated in FIGS. 4 and 5A, the first through hole 131h1, the first concave hole 132h1, the second through hole 131h2, and the second concave hole 132h2 are extended along the Y axis; the fixing element 140 passes through the first through hole 131*h*1, the first concave hole 132*h*1, the second through hole 131*h*2, and the second concave hole 132*h*2 along the Y axis and fixes the relative position between the first sub-coupling element 131 and the second sub-coupling element 132.

Moreover, the first inclined surface 110*s*1, the second inclined surface 120*s*1, the third inclined surface 130*s*1, and the fourth inclined surface 130*s*2 are regularly extended around the Z axis to form a closed ring (360°) or an open ring (less than 360°). Thus, when the first sub-coupling element 131 and the second sub-coupling element 132 are assembled to the first joint 110 and the second joint 120, the first sub-coupling element 131 and the second sub-coupling element 132 are not limited by the assembly direction. For example, during the assembly process, firstly, the first joint 110 and the second joint 120 are jointed together; next, one of the first sub-coupling element 131 and the second sub-coupling element 132 can be coupled to any position on the first joint 110 and the second joint 120; then, the other one of the first sub-coupling element 131 and the second sub-coupling element 132 can be jointed to the first sub-coupling element 131 and the second sub-coupling element 132; lastly, the first sub-coupling element 131 and the second sub-coupling element 132 can be fixed using the fixing element 140.

Referring to FIGS. 6A to 6E, diagrams of an assembly process (or manufacturing process) of the robot arm 100 of FIG. 1A are shown.

Figure 6A:
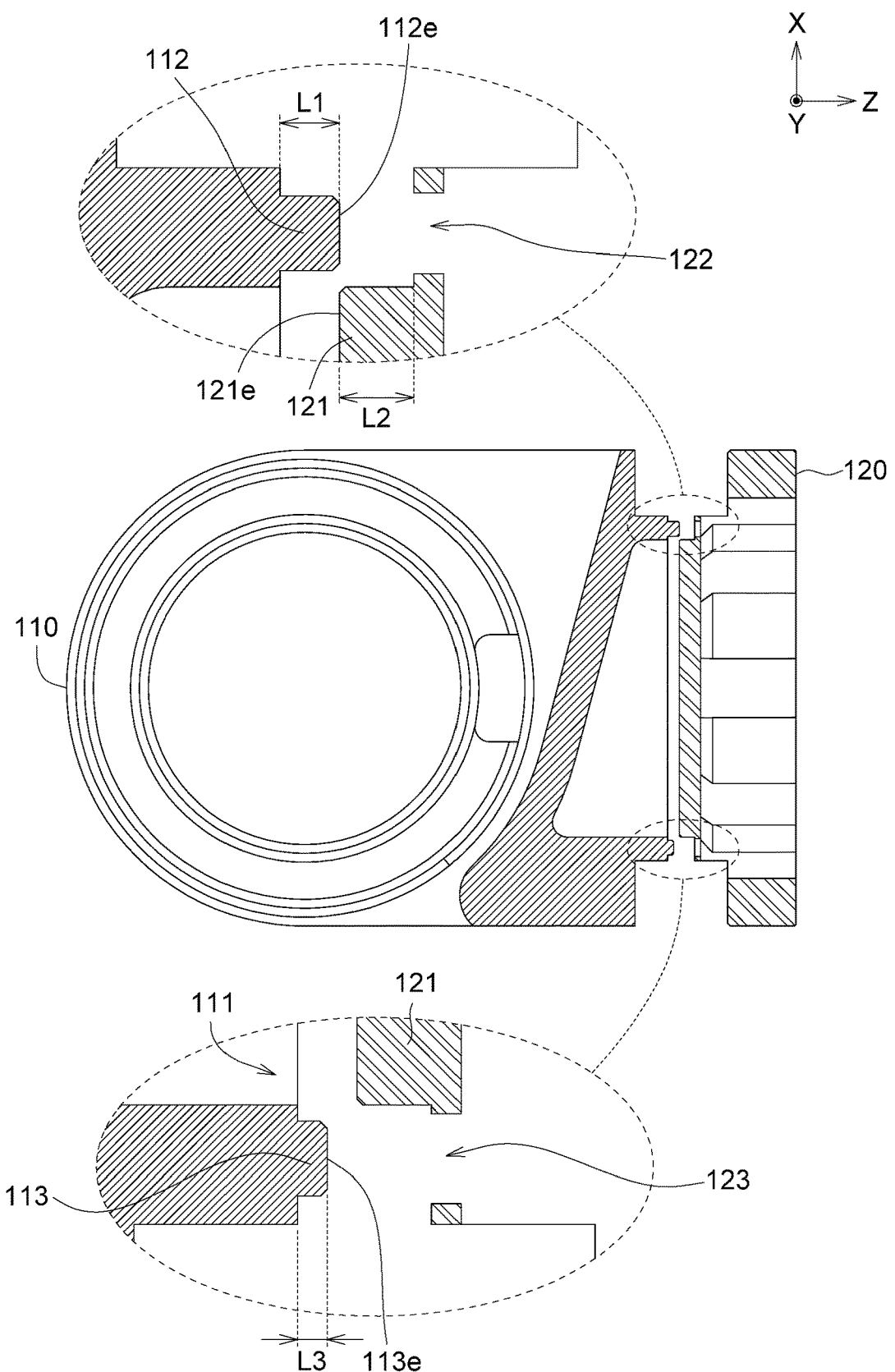
FIGS. 6A to 6E are diagrams of an assembly process of the robot arm of FIG. 1A.

Firstly, a first joint 110, a second joint 120, and a coupling element 130 are provided. As indicated in FIG. 6A, the first joint 110 further includes a positioning hole 111, a first positioning portion 112, and a third positioning portion 113; and the second joint 120 further includes a positioning shaft 121, a second positioning portion 122, and a fourth positioning portion 123. The terminal surface 112*e* of the first positioning portion 112 of the first joint 110 is protruded relative to the first terminal surface 110*e* of the first joint 110 by a first length L1; the terminal surface 121*e* of the positioning shaft 121 of the second joint 120 is protruded relative to the second terminal surface 120*e* of the second joint 120 by a second length L2; the terminal surface 113*e* of the third positioning portion 113 of the first joint 110 is protruded relative to the terminal surface 110*e* of the first joint 110 by a third length L3.

Figure 6B:
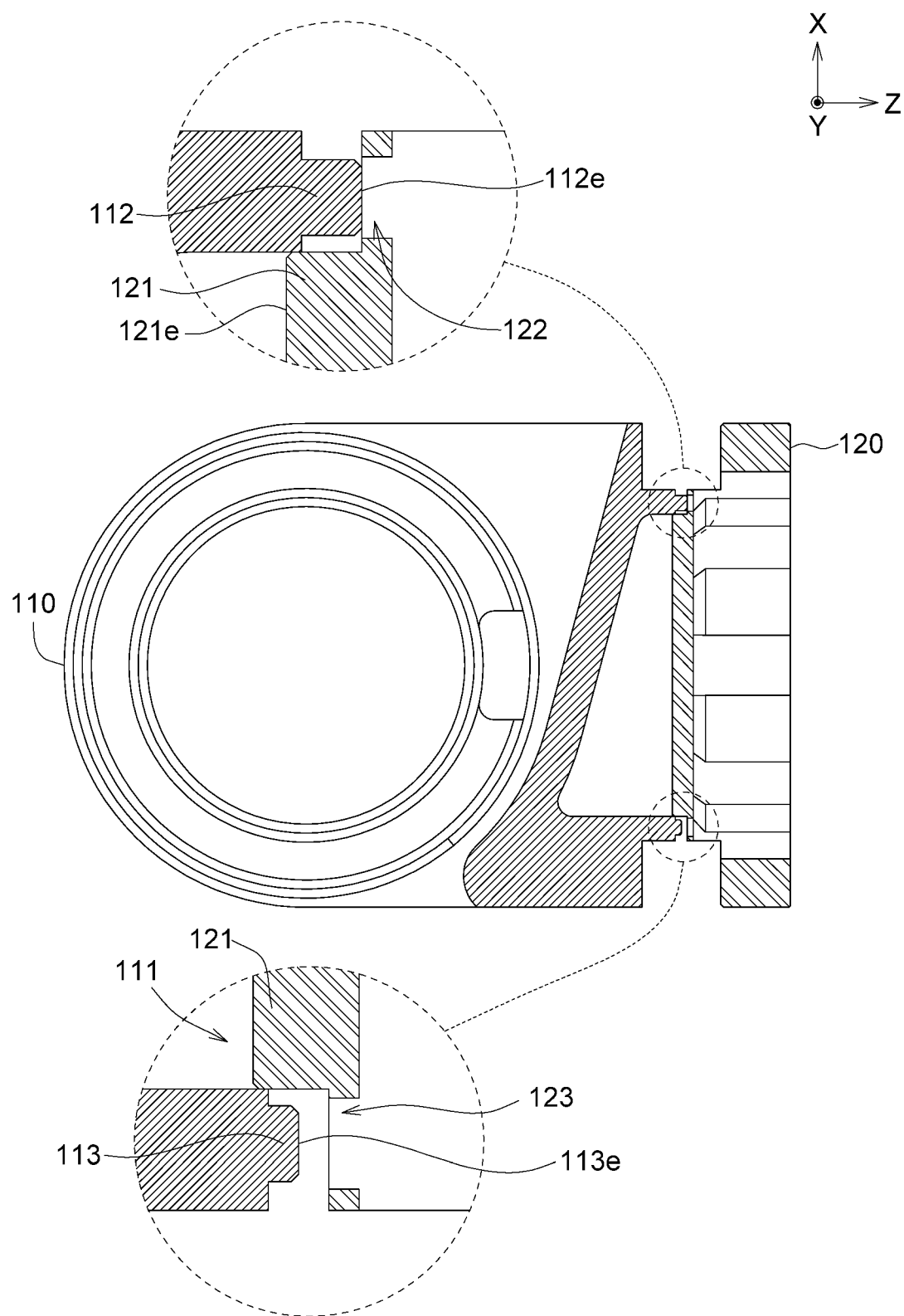

Then, as indicated in FIG. 6B, the first joint 110 and the second joint 120 are jointed together. The engagement between the first joint 110 and the second joint 120 depends on the relation between the first length L1, the second length L2, and the third length L3, and different scenarios of the engagement are below disclosed in embodiments 1 to 4 with accompanying drawings FIGS. 6A to 6E.

In embodiment 1, the second length L2 is greater than the first length L1, and the first length L1 is greater than the third length L3 (that is, the third length L3 is less than the second length L2).

Figure 6C:
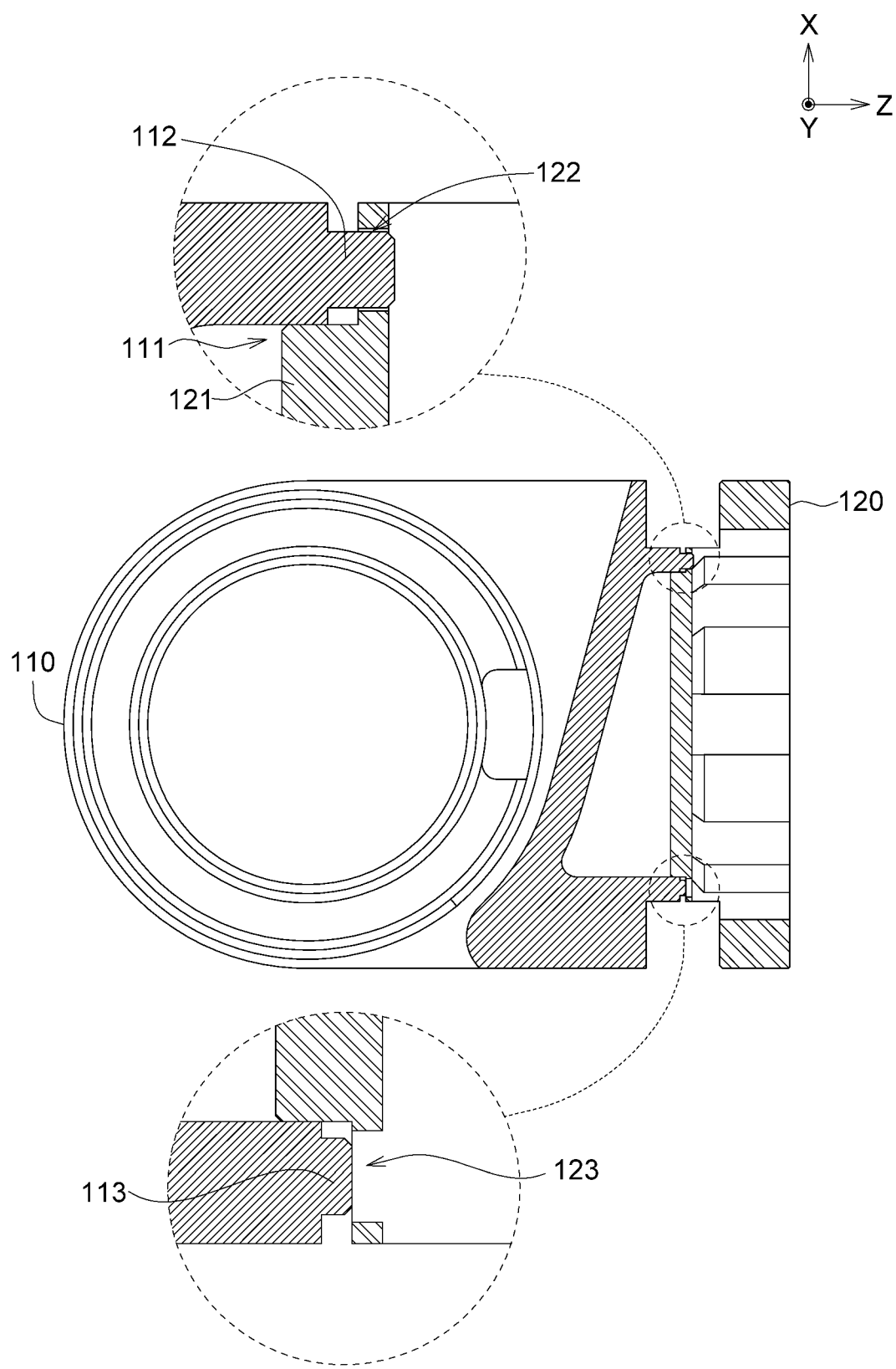
Figure 6D:
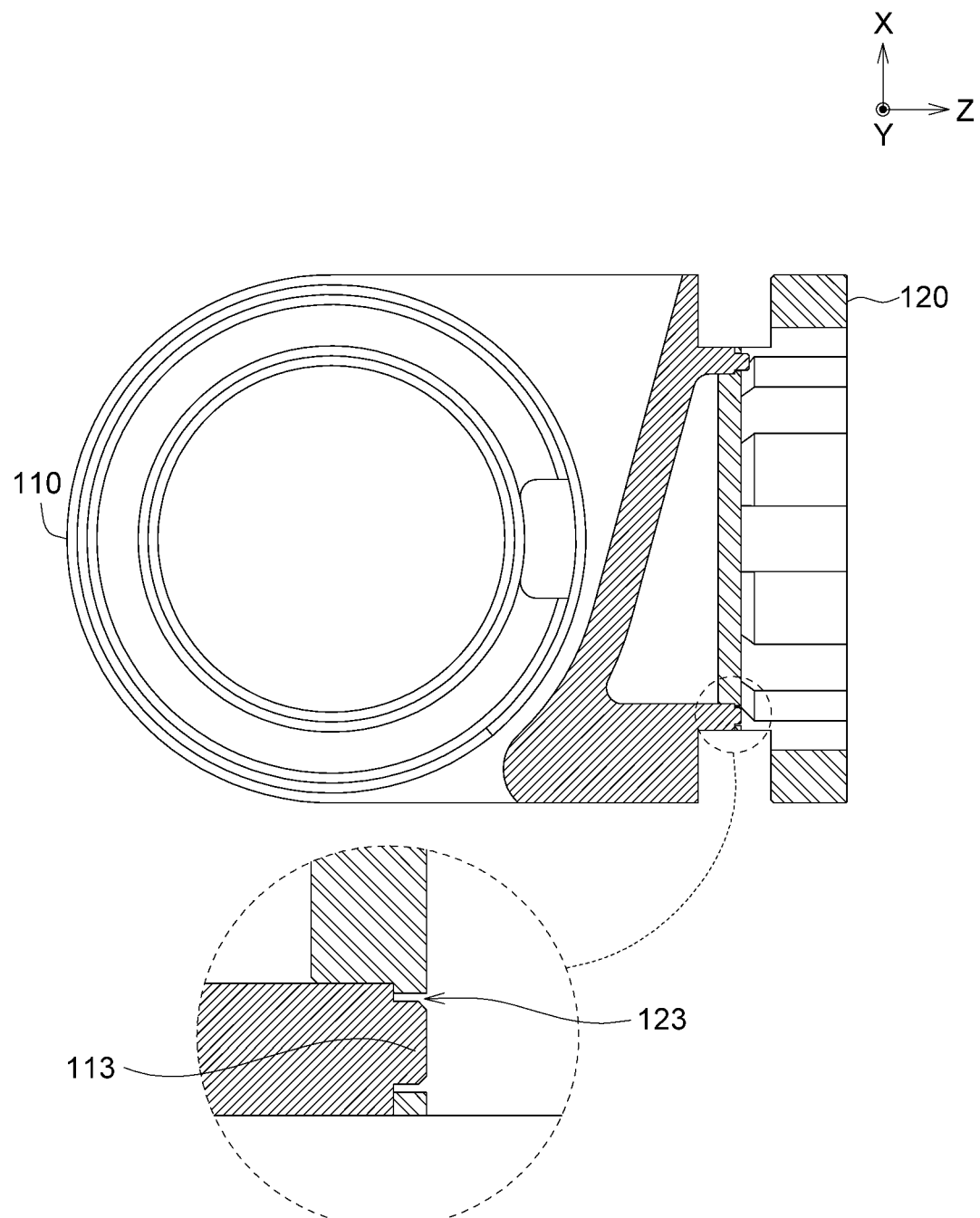

Thus, during the process of jointing the first joint 110 and the second joint 120 together, firstly, the positioning hole 111 of the first joint 110 and the positioning shaft 121 of the second joint 120 are engaged with each other (as indicated in FIG. 6B); next, the first positioning portion 112 of the first joint 110 and the second positioning portion 122 of the second joint 120 are engaged with each other (as indicated in FIG. 6C); lastly, the third positioning portion 113 of the first joint 110 and the fourth positioning portion 123 of the second joint 120 are engaged with each other (as indicated in FIG. 6D).

In embodiment 2, the first length L1 is greater than the second length L2, and the second length L2 is greater than the third length L3.

Thus, during the process of jointing the first joint 110 and the second joint 120 together, firstly, the first positioning portion 112 of the first joint 110 and the second positioning portion 122 of the second joint 120 are engaged with each other; next, the positioning hole 111 of the first joint 110 and the positioning shaft 121 of the second joint 120 are engaged with each other; then the third positioning portion 113 of the first joint 110 and the fourth positioning portion 123 of the second joint 120 are engaged with each other.

In embodiment 3, the first length L1 is substantially equivalent to the second length L2, and the second length L2 is greater than the third length L3.

Thus, during the process of jointing the first joint 110 and the second joint 120 together, firstly, the first positioning portion 112 of the first joint 110 and the second positioning portion 122 of the second joint 120 as well as the positioning hole 111 of the first joint 110 and the positioning shaft 121 of the second joint 120 are almost concurrently or synchronically engaged with each other; next, the third positioning portion 113 of the first joint 110 and the fourth positioning portion 123 of the second joint 120 are engaged with each other.

In embodiment 4, the first length L1 is greater than the second length L2, and the second length L2 is substantially equivalent to the third length L3.

Thus, during the process of jointing the first joint 110 and the second joint 120 together, firstly, the positioning hole 111 of the first joint 110 and the positioning shaft 121 of the second joint 120 are engaged with each other; next, the first positioning portion 112 of the first joint 110 and the second positioning portion 122 of the second joint 120 as well as the third positioning portion 113 of the first joint 110 and the fourth positioning portion 123 of the second joint 120 are almost concurrently or synchronically engaged with each other.

Figure 6E:
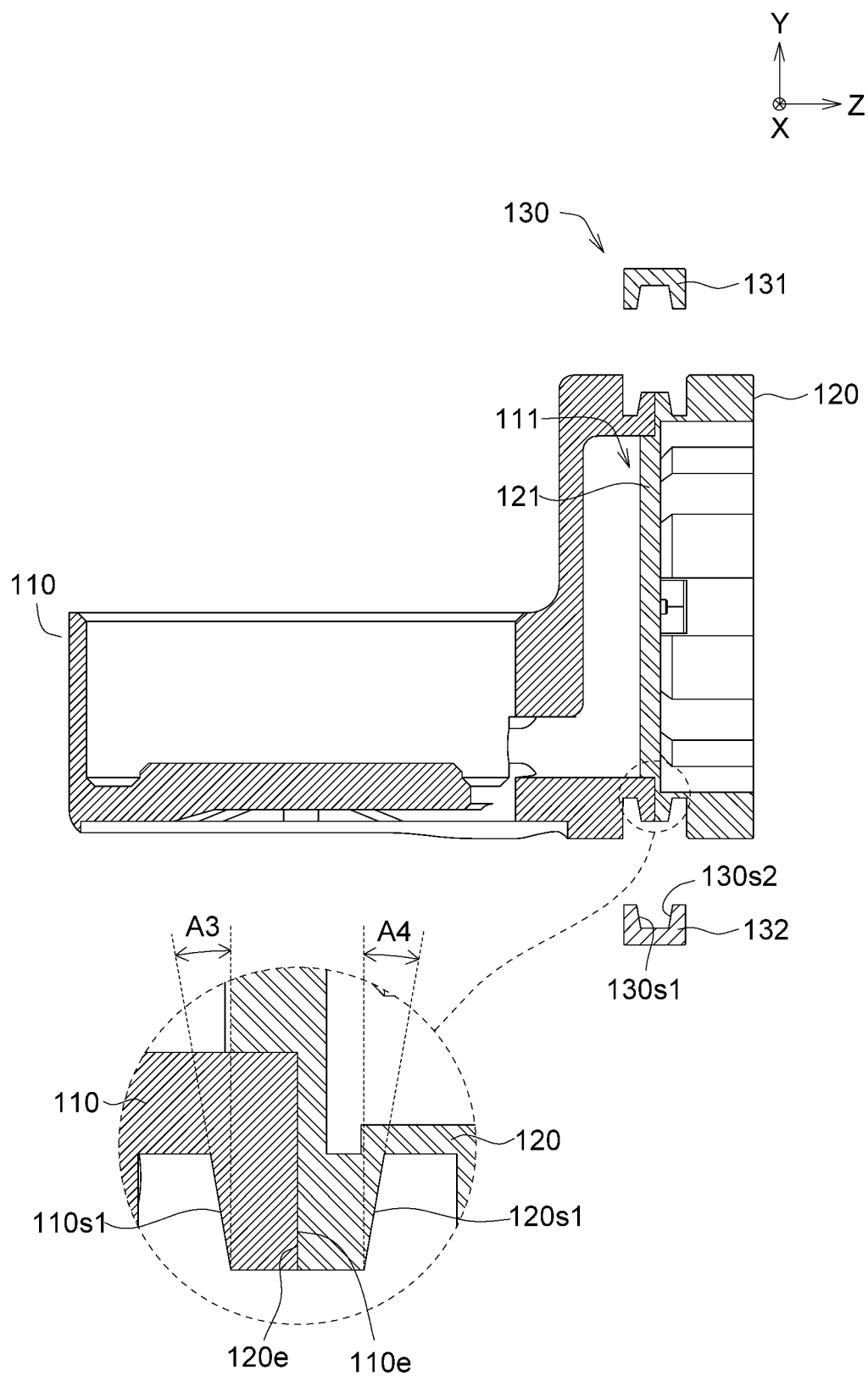

As indicated in FIG. 6E (the view angle of FIG. 6E is different from that of FIGS. 6A to 6D), after the first joint 110 and the second joint 120 are jointed together, the first joint 110 and the second joint 120 are coupled with the coupling element 130. Then, the third inclined surface 130*s*1 of the coupling element 130 contacts the first inclined surface 110*s*1 of the first joint 110, and the fourth inclined surface 130*s*2 of the coupling element 130 contacts the second inclined surface 120*s*1 of the second joint 120.

As indicated in FIG. 6E, the coupling element 130 includes a first sub-coupling element 131 and a second sub-coupling element 132. The first sub-coupling element 131 and the second sub-coupling element 132 are not limited by the assembly direction when assembled to the first joint 110 and the second joint 120. For example, during the assembly process, firstly, the first joint 110 and the second joint 120 are jointed; next, one the first sub-coupling element 131 and the second sub-coupling element 132 can be coupled to any position on the first joint 110 and the second joint 120; then, the other one of the first sub-coupling element 131 and the second sub-coupling element 132 can be jointed to the first sub-coupling element 131 and the second sub-coupling element 132. Thus, the first sub-coupling element 131 and the second sub-coupling element 132 can be quickly coupled with the first joint 110 and the second joint 120 which have been jointed together.

As indicated in FIG. 6E, the angle A3 between the first inclined surface 110*s*1 and the first terminal surface 110*e* can be any value in a range of 5 to 15°, such as 10°. Similarly, the angle A4 between the second inclined surface 120s1 and the second terminal surface 120e can be any value in a range 5 to 15°, such as 10°. Through the design of the angles A3 and A4, the coupling element 130, the first joint 110, and the second joint 120 can be tightly coupled, such as tapered together.

Then, relative position between the coupling element 130 and the first joint 110 and the second joint 120 is fixed using at least one fixing element 140 (the fixing element 140 is illustrated in FIG. 1A). For example, the first sub-coupling element 131 and the second sub-coupling element 132, which have been jointed together, can be screwed and fixed together by a fixing element 140, such that the third inclined surface 130s1 of the coupling element 130 can tightly contact the first inclined surface 110s1 of the first joint 110, and the fourth inclined surface 130s2 of the coupling element 130 can tightly contact the second inclined surface 120s1 of the second joint 120. Furthermore, the fixing element 140 temporarily fixes the first joint 110 and the second joint 120, such that the robot arm 100 is provided with detachability.

As indicated in FIG. 1A, the fixing element 140 fixes relative positions between the first joint 110, the second joint 120, and the coupling element 130 from the exterior of the first joint 110, the second joint 120, and the coupling element 130 (not the jointing surface between the first joint 110 and the second joint 120), such that the robot arm 100 can be conveniently and quickly assembled. Also, during the assembly process of the robot arm 100, the first joint 110 and the second joint 120 are jointed along a linear direction, such as the Z axis (as indicated in FIG. 6B to 6E), and the first sub-coupling element 131 and the second sub-coupling element 132 are jointed to the first joint 110 and the second joint 120 along another linear direction, such as the Y axis or the X axis (as indicated in FIG. 6E). Since the elements can be quickly and easily jointed together, the robot arm 100 is provided with quick detachability.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A robot arm, comprising:
   a first joint having a first inclined surface;
   a second joint jointed to the first joint and having a second inclined surface; and
   a coupling element having a third inclined surface and a fourth inclined surface opposite to the third inclined surface;
   wherein the third inclined surface contacts the first inclined surface, and the fourth inclined surface contacts the second inclined surface;
   wherein the first joint comprises a positioning hole, the second joint comprises a positioning shaft, the positioning hole matches the positioning shaft, a first clearance is formed between the positioning hole and the positioning shaft along a first clearance direction, and a second clearance is formed between the positioning hole and the positioning shaft along a second clearance direction;
   wherein the first joint comprises a first positioning portion, the second joint comprises a second positioning portion, the first positioning portion matches the second positioning portion, a third clearance is formed between the first positioning portion and the second positioning portion along the first clearance direction, and a fourth clearance is formed between the first positioning portion and the second positioning portion along the second clearance direction;
   wherein the third clearance and the fourth clearance are less than the first clearance and the second clearance;
   wherein the first joint comprises a third positioning portion, the second joint comprises a fourth positioning portion, and the third positioning portion matches the fourth positioning portion; a fifth clearance is formed between the third positioning portion and the fourth positioning portion along a first clearance direction, and a sixth clearance is formed between the third positioning portion and the fourth positioning portion along a second clearance direction;
   wherein the fifth clearance is greater than the sixth clearance.

2. The robot arm according to claim 1, wherein the coupling element comprises a first sub-coupling element and a second sub-coupling element jointed to the first sub-coupling element; the first sub-coupling element has a portion of the third inclined surface, the second sub-coupling element has another portion of the third inclined surface, the first sub-coupling element has a portion of the fourth inclined surface, and the second sub-coupling element has another portion of the fourth inclined surface; and the robot arm further comprises:
   a fixing element configured to fix the first sub-coupling element and the second sub-coupling element.

3. The robot arm according to claim 1, wherein the coupling element has a groove with a groove bottom surface; the first joint has a first outer peripheral surface separated from the groove bottom, and the second joint has a second outer peripheral surface separated from the groove bottom.

4. The robot arm according to claim 1, wherein the first joint has a first recess with the first inclined surface, and the second joint has a second recess with the second inclined surface; the coupling element has a first inner peripheral surface and a second inner peripheral surface, the first inner peripheral surface is separated from the recess bottom of the first recess, and the second inner peripheral surface is separated from the second recess.

5. The robot arm according to claim 1, wherein the positioning hole has a first planar surface, a second planar surface opposite to the first planar surface, a first curved surface and a second curved surface opposite to the first curved surface, the first curved surface and the second curved surface connect the first planar surface and the second planar surface; the positioning shaft has a third planar surface, a fourth planar surface opposite to the third planar surface, a third curved surface, and a fourth curved surface opposite to the third curved surface, the third curved surface and the fourth curved surface connect the third planar surface and the fourth planar surface; the first planar surface is opposite to the third planar surface, the second planar surface is opposite to the fourth planar surface, the first curved surface is opposite to the third curved surface, and the second curved surface is opposite to the fourth curved surface.

6. The robot arm according to claim 5, wherein a center of circle of the first curved surface and a center of circle the second curved surface substantially overlap.

7. The robot arm according to claim 5, wherein a central angle of the first curved surface and a central angle of the second curved surface both are in a range of 60° to 150°.

8. The robot arm according to claim 1, wherein the first clearance and the second clearance are different.

9. The robot arm according to claim 1, wherein the third clearance and the fourth clearance are the same.

10. The robot arm according to claim 1, wherein the first joint comprises a first terminal surface, the positioning hole is recessed relative to the first terminal surface, the first positioning portion is protruded relative to the first terminal surface by a first length, the second joint comprises a second terminal surface, the positioning shaft is protruded relative to the second terminal surface by a second length, the second positioning portion is recessed relative to the second terminal surface, and the first terminal surface is jointed to the second terminal surface.

11. The robot arm according to claim 10, wherein the second length is greater than the first length.

12. The robot arm according to claim 10, wherein the third positioning portion protruded relative to the first terminal surface by a third length, and the fourth positioning portion recessed relative to the second terminal surface.

13. The robot arm according to claim 12, wherein the third length is less than the second length.

14. A mechanical assembly, comprising:
a first component having a first inclined surface;
a second component jointed to the first component and has a second inclined surface; and
a coupling element having a third inclined surface and a fourth inclined surface opposite to the third inclined surface;
wherein the third inclined surface contacts the first inclined surface, and the fourth inclined surface contacts the second inclined surface;
wherein the first component comprises a positioning hole, the second component comprises a positioning shaft, the positioning hole matches the positioning shaft, a first clearance is formed between the positioning hole and the positioning shaft along a first clearance direction, and a second clearance is formed between the positioning hole and the positioning shaft along a second clearance direction;
wherein the first component comprises a first positioning portion, the second component comprises a second positioning portion, the first positioning portion matches the second positioning portion, a third clearance is formed between the first positioning portion and the second positioning portion along the first clearance direction, and a fourth clearance is formed between the first positioning portion and the second positioning portion along the second clearance direction;
wherein the third clearance and the fourth clearance are less than the first clearance and the second clearance;
wherein the first joint comprises a third positioning portion, the second joint comprises a fourth positioning portion, and the third positioning portion matches the fourth positioning portion; a fifth clearance is formed between the third positioning portion and the fourth positioning portion along a first clearance direction, and a sixth clearance is formed between the third positioning portion and the fourth positioning portion along a second clearance direction;
wherein the fifth clearance is greater than the sixth clearance.

15. An assembly method of a robot arm, comprising:
providing a first joint, a second joint, and a coupling element, wherein the first joint has a first inclined surface, the second joint has a second inclined surface, and the coupling element has a third inclined surface and a fourth inclined surface opposite to the third inclined surface;
jointing the first joint to the second joint; and
coupling the first joint and the second joint using the coupling element, wherein the third inclined surface contacts the first inclined surface, and the fourth inclined surface contacts the second inclined surface;
wherein the first joint comprises a positioning hole, the second joint comprises a positioning shaft, the positioning hole matches the positioning shaft, a first clearance is formed between the positioning hole and the positioning shaft along a first clearance direction, and a second clearance is formed between the positioning hole and the positioning shaft along a second clearance direction;
wherein the first joint comprises a first positioning portion, the second joint comprises a second positioning portion, the first positioning portion matches the second positioning portion, a third clearance is formed between the first positioning portion and the second positioning portion along the first clearance direction, and a fourth clearance is formed between the first positioning portion and the second positioning portion along the second clearance direction;
wherein the third clearance and the fourth clearance are less than the first clearance and the second clearance;
wherein the first joint comprises a third positioning portion, the second joint comprises a fourth positioning portion, and the third positioning portion matches the fourth positioning portion; a fifth clearance is formed between the third positioning portion and the fourth positioning portion along a first clearance direction, and a sixth clearance is formed between the third positioning portion and the fourth positioning portion along a second clearance direction;
wherein the fifth clearance is greater than the sixth clearance.

16. The assembly method according to claim 15, wherein the coupling element comprises a first sub-coupling element and a second sub-coupling element jointed to the first sub-coupling element; the first sub-coupling element has a portion of the third inclined surface, the second sub-coupling element has another portion of the third inclined surface, the first sub-coupling element has a portion of the fourth inclined surface, and the second sub-coupling element has another portion of the fourth inclined surface; and the step of fixing the first joint and the second joint using the coupling element further comprises:
jointing the first sub-coupling element and the second sub-coupling element; and
fixing the first sub-coupling element and the second sub-coupling element using a fixing element.

* * * * *